United States Patent
Swiatek

(10) Patent No.: US 12,367,495 B2
(45) Date of Patent: Jul. 22, 2025

(54) CARD-NOT-PRESENT TRANSACTIONS WITH CARDHOLDER-CHOSEN CVV

(71) Applicant: IDEMIA FRANCE, Courbevoie (FR)

(72) Inventor: Lukasz Swiatek, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 45 days.

(21) Appl. No.: 17/451,733

(22) Filed: Oct. 21, 2021

(65) Prior Publication Data

US 2022/0129901 A1 Apr. 28, 2022

(30) Foreign Application Priority Data

Oct. 22, 2020 (FR) ...................................... 2010850

(51) Int. Cl.
G06Q 20/40 (2012.01)
G06Q 20/34 (2012.01)
G06Q 20/38 (2012.01)

(52) U.S. Cl.
CPC ..... *G06Q 20/4018* (2013.01); *G06Q 20/3567* (2013.01); *G06Q 20/3825* (2013.01); *G06Q 20/405* (2013.01)

(58) Field of Classification Search
CPC .......... G06Q 20/4018; G06Q 20/3567; G06Q 20/3825; G06Q 20/405; G06Q 20/12; G06Q 20/20; G06Q 20/3223; G06Q 20/326; G06Q 20/3267; G06Q 20/3829; G06Q 20/385; G06Q 20/4012; G06Q 20/425

See application file for complete search history.

(56) References Cited

U.S. PATENT DOCUMENTS

| 10,438,198 B1 * | 10/2019 | Griffin | ............... G06Q 20/4012 |
| 2008/0110983 A1 * | 5/2008 | Ashfield | ............... G07F 7/1008 235/382 |

(Continued)

FOREIGN PATENT DOCUMENTS

| JP | 2014096140 A | * | 5/2014 | .......... G06Q 20/027 |
| KR | 20120090260 A | * | 8/2012 | |

OTHER PUBLICATIONS

"InComm Collaborating with CVV+ to Reduce Payment Card Fraud", Nov. 15, 2016, InComm (Year: 2016).*

*Primary Examiner* — Duan Zhang
(74) *Attorney, Agent, or Firm* — NIXON & VANDERHYE

(57) ABSTRACT

A cardholder enters (305) payment information and a freely-selected transaction CVV in a merchant system (20). A payment system (30) receives (400) a request from the merchant system including the transaction CVV and transaction information, and sends (405) a transaction authorization request to a cardholder device (13). The transaction information are displayed (310) on the cardholder device and invites the cardholder to enter the transaction CVV for confirmation purpose. In response, the cardholder enters (315) a confirmation CVV. The payment system approves (240, 415) the transaction when the transaction and confirmation CVVs are the same. As a result, the CVV can have a short life and be changed at each transaction, thereby increasing the security of the transactions. Also, PCI certification constraints on servers are reduced since no issuer master key is required for the CVVs. Lastly, the cardholder has more control on the transaction validation.

18 Claims, 3 Drawing Sheets

(56) References Cited

U.S. PATENT DOCUMENTS

| | | | |
|---|---|---|---|
| 2010/0106649 A1* | 4/2010 | Annan | G06Q 20/326 |
| | | | 705/67 |
| 2011/0184867 A1* | 7/2011 | Varadarajan | G06Q 20/4018 |
| | | | 235/382 |
| 2013/0054414 A1* | 2/2013 | Tarnanen | G06Q 20/3255 |
| | | | 705/27.1 |
| 2015/0186871 A1* | 7/2015 | Laracey | G06Q 20/322 |
| | | | 705/41 |
| 2017/0032369 A1* | 2/2017 | Hugot | G06Q 20/3825 |
| 2017/0262842 A1* | 9/2017 | Subbarayan | G06Q 20/38215 |
| 2018/0341944 A1 | 11/2018 | Gulchenko | |
| 2020/0382480 A1* | 12/2020 | Isaacson | G06Q 20/384 |
| 2021/0044975 A1* | 2/2021 | Triest | H04W 12/068 |

* cited by examiner

[Fig. 1]
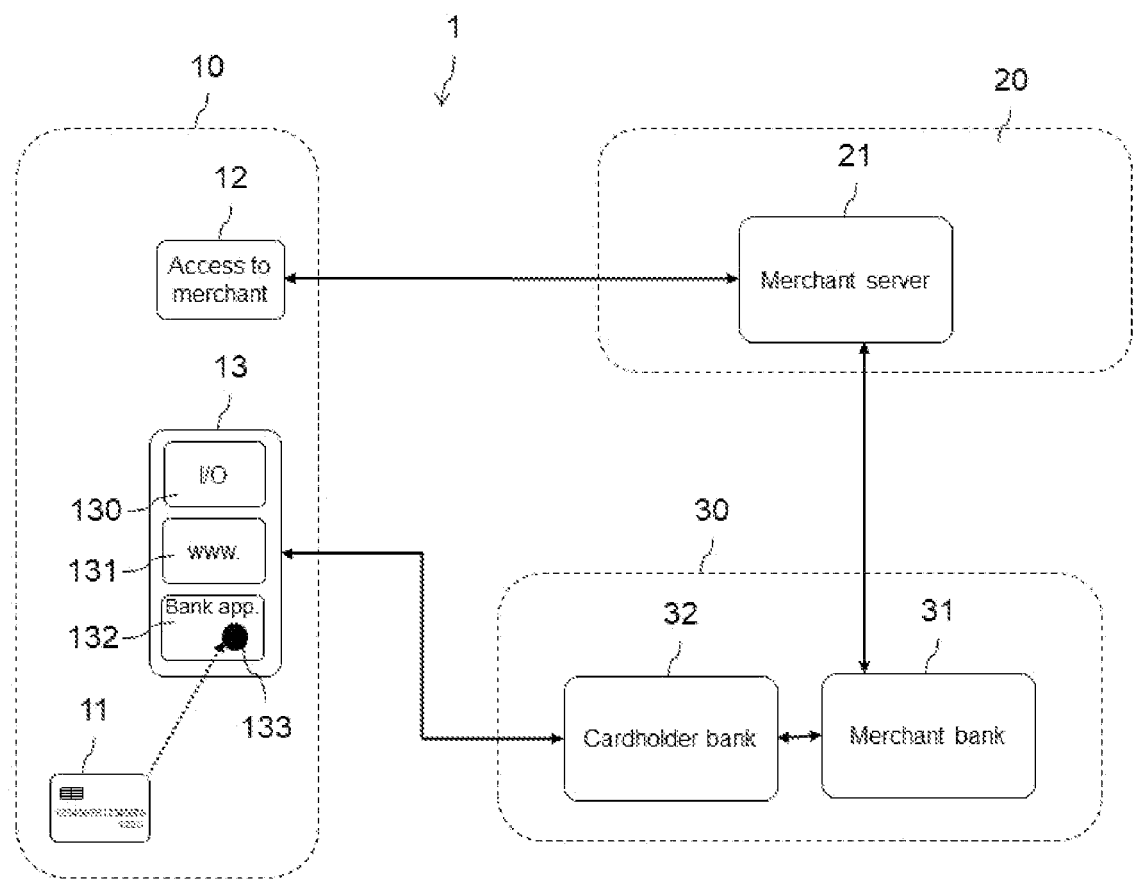

[Fig. 2]
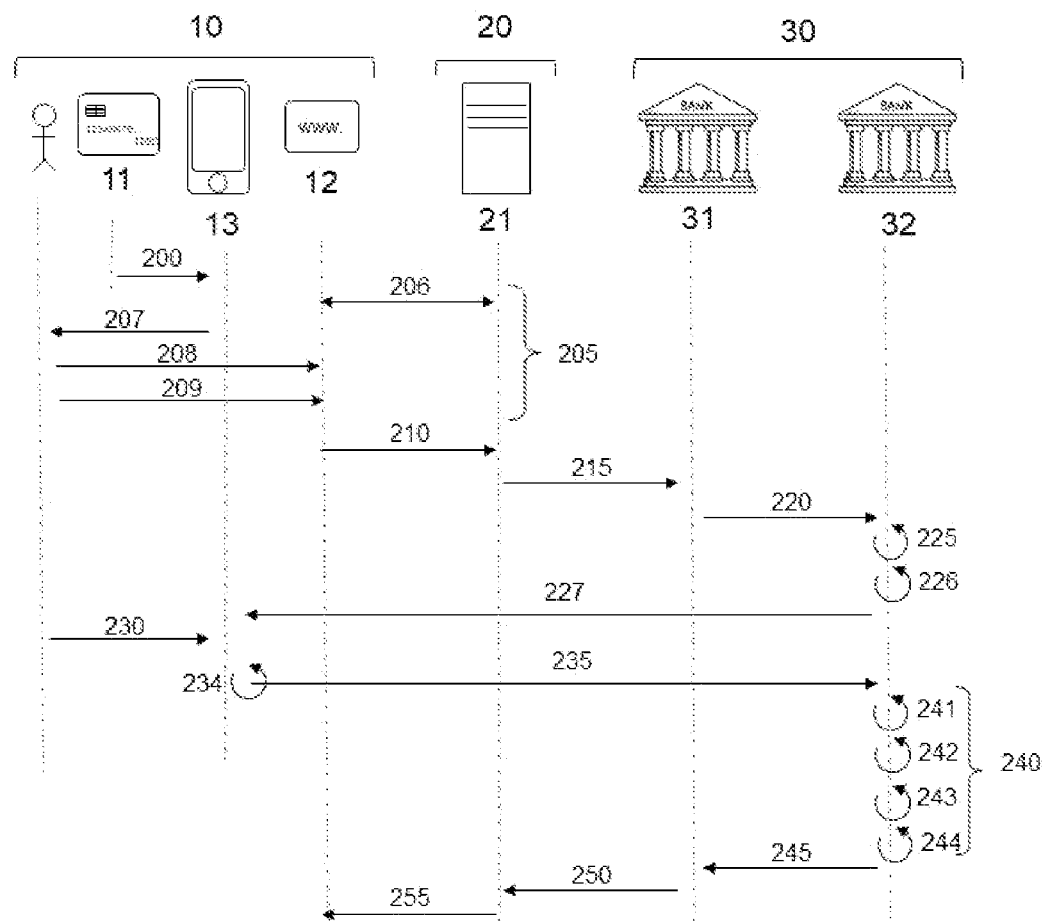

[Fig. 3]
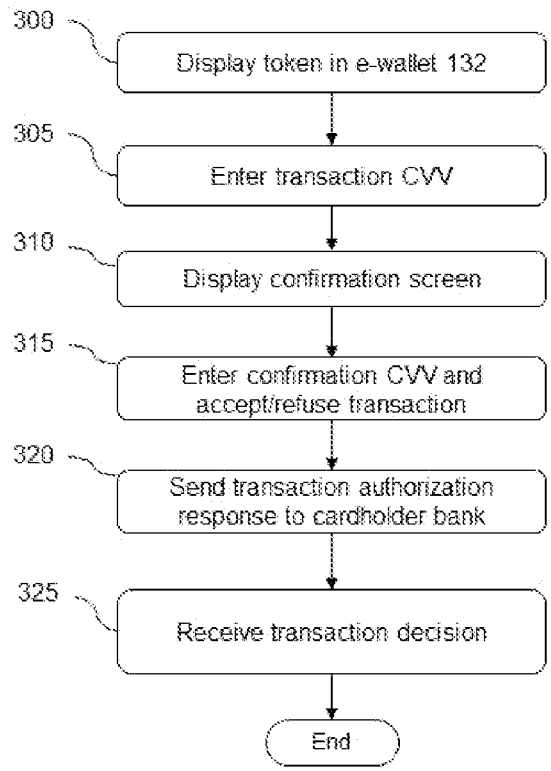
[Fig. 4]
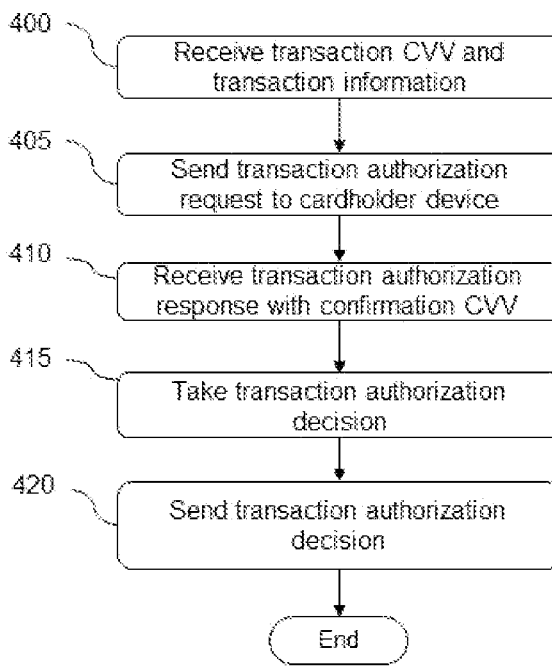

CARD-NOT-PRESENT TRANSACTIONS WITH CARDHOLDER-CHOSEN CVV

CROSS-REFERENCE TO RELATED APPLICATIONS

This application claims priority pursuant to 35 U.S.C. 119(a) to France Patent Application No. 2010850, filed Oct. 22, 2020, which application is incorporated herein by reference in its entirety.

FIELD OF THE INVENTION

The present application relates to card-not-present transactions.

BACKGROUND OF THE INVENTION

Financial transactions based on payment cards such as credit and debit cards, show certain security issues. In order to perform a card-based transaction using, for example, a credit card, a user cardholder must provide a primary account number (PAN) and a card verification value, known as a Card Verification Value (CVV or CV2), Card Verification Code (CVC) or Card Security Code (CSC). As described herein, the terms CVV, CVC and CSC may be used interchangeably.

A card verification value (CVV) is usually printed on the front or back of the payment card, typically in human readable characters. This may be a three-digit or four-digit value.

The CVV is used to verify that the customer has the card in its possession when performing the transaction. It is thus a strictly confidential information. For example, when the transaction is a "card not present" transaction, where the payment card cannot be swiped or its chip be read, such as an on-line or telephone transaction, the printed CVV code can be inputted through a keypad or provided verbally to confirm the customer conducting the transaction is in possession of the payment card, or at least, has knowledge of the card verification code.

Nowadays, additional security mechanisms have been developed to secure the transaction. For instance, the cardholder bank receiving a request for a transaction from a merchant system (or merchant bank) may require the cardholder to confirm the transaction. This may be done using a cardholder device having a cardholder bank app. Responsive to a cardholder confirmation, the cardholder bank then authorizes the transaction to the merchant system. These mechanisms have however drawbacks, such as complicating the transaction process through the implementation of a redirection from the merchant website to the bank service for transaction confirmation.

Card-not-present transactions have certain security vulnerabilities. As the PAN and/or the CVV are provided as human readable characters, and are either keyed in, entered into a printed or faxed order form, or provided verbally, they cannot typically be protected cryptographically, e.g., encoded. It is thus easy for malicious parties to retrieve the card information and reuse them for fraudulent transactions.

Dynamic CVV has been developed to overcome part of these vulnerabilities. A new CVV is dynamically generated at a determined temporal recurrence based on an issuer master key. This solution is however not fully satisfying because it requires a PCI certification of the server or servers due to the use of a master key.

New technics to reduce fraudulent transactions in existing payment infrastructures would be welcomed. New technics to give the cardholder more control on the CVV would also be welcomed. New technics that reduce PCI certification constraints would also be welcomed. More generally, securing card-not-present transactions is sought.

SUMMARY OF THE INVENTION

To overcome some of the foregoing concerns, the inventor contemplates allowing the cardholder to freely define its CVV with a confirmation mechanism to which a malicious person has no access and which guarantees the cardholder is still in possession of credentials of the payment card (which is equivalent to being in possession of the payment card itself).

As a result, the CVV can have a short life and be changed at each transaction, thereby increasing the security of the transactions. Also, PCI certification constraints on the server are reduced since no issuer master key is required for the CVV. Lastly, the cardholder has more control on the transaction validation.

In this context, the invention first provides a method of performing a card-not-present transaction, the method comprising at a payment system:
receiving a first card verification value, CVV, with transaction information from a merchant system,
receiving, from a cardholder device, a transaction authorization response that is based on a second CVV. The cardholder device is a personal device of the cardholder, thus separate from the merchant system, that is associated with the payment card used for the transaction. For instance, a smartphone with a bank app or e-wallet may be used, and
approving or refusing the transaction based on the first and second CVVs. Approving the transaction is synonymous for authorizing, allowing or validating the transaction.

Correlatively, at the cardholder, a method of performing a card-not-present transaction comprises:
entering a first CVV in a merchant system connected to a payment system, to initiate a transaction,
entering an user transaction confirmation on a cardholder device connected to the payment system, the user transaction confirmation being based on a second CVV, and
receiving through the merchant system an approval or refusal of the transaction depending on the first and second CVV.

Therefore, when performing a transaction, a customer enters a first CVV that may be freely chosen together with card-based payment or transaction information (e.g. token PAN, expiry date, . . . ). The payment system may request a transaction authorization to the card issuer, which is forwarded to a cardholder device. Transaction information may then be displayed to the cardholder inviting him to validate or not the transaction. The cardholder may enter an expected CVV (the second one) based on the first CVV, e.g. the same CVV, to authorize the transaction, or confirm a displayed CVV or select a CVV from displayed CVVs. The payment system receiving such response to the transaction authorization request may determine, based on the entered CVV and the confirmation CVV, whether to allow or refuse the transaction.

The present invention also provides a payment system processing a card-not-present transaction, the payment system comprising:

a transaction receiving server configured to receive a first card verification value, CVV, with transaction information from a merchant system, an authorization server configured to receive, from a cardholder device, a transaction authorization response that is based on a second CVV, and to approve or refuse the transaction based on the first and second CVVs.

Correlatively, a cardholder system comprises an access device to a merchant system and a cardholder device connected to a payment system. The access device may be a mere web browser enabling access to a merchant website.

The access device is configured for a cardholder to enter a first CVV in the merchant system to initiate a transaction.

The cardholder device is configured for the cardholder to enter an user transaction confirmation, the user transaction confirmation being based on a second CVV.

And the access device receives through the merchant system an approval or refusal of the transaction depending on the first and second CVV.

Optional features of embodiments of the invention are defined in the appended claims. Some of these features are explained here below with reference to a method, while they can be transposed into device features.

In some embodiments, the first CVV is entered by the cardholder in the merchant system and the second CVV is entered by the cardholder on the cardholder device or selected by the cardholder from a list of CVVs displayed on the cardholder device or confirmed by the cardholder when displayed on the cardholder device. Preferably, the first CVV is freely selected by the cardholder, being noted that the second CVV should be a confirmation of the first one. The selection can be made from a predefined range of values, typically from $[0, 10^n-1]$ where n is the number of digits of the CVV.

In other embodiments, receiving the transaction authorization response is responsive to sending a transaction authorization request to the cardholder device. Therefore, the transaction confirmation through the inputting/selection/confirmation of the second CVV can take place within the conventional transaction authorization process, wherein the cardholder device is additionally solicited via the transaction authorization request. The transaction authorization request preferably comprises the transaction information (to be displayed to the customer) to allow the cardholder to validate the transaction with sufficient knowledge thereof.

In specific embodiments, sending the transaction authorization request is responsive to receiving a request for a transaction from the merchant system, the request for the transaction including the first CVV and the transaction information.

In some embodiments, the transaction is approved when the second CVV equals an expected value based on the first CVV. For instance, the first and second CVVs may be the same, meaning the expected value is the first CVV. Indeed, as the cardholder can freely choose the CVV for the transaction, validation thereof is preferably made when the confirmation CVV (the second one) entered during the transaction authorization process is the same as the initial one. In a variant, the expected value may be a reference value, result of a secret operation (known by the cardholder and the payment system) on the first CVV known. For example, the reference value may be the result of an addition of the first CVV with a personal and/or secret value (e.g. birth year).

In some embodiments, the transaction authorization response is received together with a first digital signature thereof computed based on a card-based payment token (e.g. credentials dedicated to digital signature) stored on the cardholder device. A card-based payment token conventionally results from the tokenization of a payment card that secures the payment information (PAN and expiry date) in the cardholder device. The signature of the response increases the securing of the authorization process.

In specific embodiments, approving or refusing the transaction includes computing a second digital signature based on the first CVV and a locally-generated card-based payment token (using the same tokenization process) for the cardholder, and comparing the first and second digital signatures.

In some embodiments, the transaction is refused if the first CVV is the same as one CVV used during one of last transactions (typically in one of the last N previous transactions for the cardholder, N being an integer).

From the cardholder perspective, in some embodiments, entering the user transaction confirmation includes entering the second CVV on the cardholder device or selecting the second CVV from a list of CVVs displayed on the cardholder device or confirming a CVV displayed on the cardholder device (e.g. the first CVV is displayed for confirmation, or various CVVs including the first CVV or an equivalent reference CVV are successively displayed, waiting for an user confirmation when the right CVV is displayed) as the second CVV.

In some embodiments, entering the user transaction confirmation is responsive to a transaction authorization request from the payment system that displays information of the transaction on the cardholder device.

In other embodiments, the second CVV equals a reference value based on the first CVV, e.g. the first and second CVVs are the same, to receive an approval of the transaction. Again, the first CVV can be freely selected by the cardholder.

In embodiments, the method further comprises sending by the cardholder device a transaction authorization response, including the user transaction confirmation (i.e. based on the second CVV), to the payment system. The transaction authorization response may be accompanied with a digital signature thereof computed based on a card-based payment token stored on the cardholder device.

In some embodiments, the method further comprises previously (i.e. before the first CVV is entered by the customer) displaying card-based payment token information on a screen of the cardholder device, wherein the first CVV is entered in the merchant system together (i.e. the same payment form or succession of forms for the same transaction) with the displayed card-based payment token information. Such information typically includes a Token PAN, an expiry date. The first CVV and this information are thus input together, i.e. in the same payment form for the transaction or in the same succession of forms for the same transaction.

Another aspect of the invention relates to a non-transitory computer-readable medium storing a program which, when executed by a microprocessor or computer system, causes the system to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 1 illustrates a transaction system in which embodiments of the present invention can be implemented, FIG. 2 illustrates exemplary message exchanges to implement embodiments of the present invention, FIG. 3 illustrates, using a flowchart, exemplary steps to implement the present invention at a cardholder side, and FIG. 4 illustrates, using a flowchart, exemplary steps to implement the present invention at a payment system side.

DETAILED DESCRIPTION OF THE INVENTION

The invention applies to financial transactions and more particularly to card-not-present transactions, an example of which is the purchase of one or more products on a web site. The card used for the payment is not swiped or its chip is not read. The consumer needs to input information of the payment card, such as a PAN, an expiry date and a card verification value known as CVV or CVC or CSC. Here below, reference is made to CVV to designate any type of card verification value. An authorization process is then run in the payment system or infrastructure underlying to the merchant system to check the transaction, the payment information and the cardholder account balance for instance. An authorization (or refusal) is then issued that validates the purchase, the purchase amount being transferred from the cardholder bank account to the merchant bank account in the payment system.

Although reference below is made to online transactions (over Internet), other card-not-present transactions may be contemplated in the context of the present invention, provided that a CVV is entered in addition to payment card information (e.g. PAN and expiry date). These include for instance mail-order transactions by mail or fax, or transactions over the telephone.

FIG. 1 illustrates a system 1 to implement a card-not-present transaction according to embodiments of the invention.

The system 1 comprises a cardholder environment or system 10, a merchant environment, infrastructure or system 20 and a payment environment, infrastructure or system 30.

The cardholder system 10 comprises a payment card 11 of the cardholder, an access device 12 to access the merchant system 20 and a cardholder personal device 13. The payment card 11 may be of any type, with or without magnetic stripe, with or without a secured chip. It may be provided as a physical medium or in an electronic form. The payment card 11 usually includes cardholder name, a PAN and an expiry date, for instance all printed or embossed on the physical card. Some payment cards are further provided with an attached CVV, for instance they include a CVV printed on their front or back. The CVV may be a three-digit code (for instance for Visa and Mastercard cards—registered trademarks) or be a four-digit code (for instance for American Express—registered trademark). Of course, any number of digits may be contemplated within the scope of the present invention. Some payment cards do not have any CVV printed thereon.

The payment card 11 may be tokenized into the cardholder personal device 13. It means that part or all of the card information (typically PAN) is converted into numeric code or codes (typically token PAN) also known as "token". The token, referenced 133 in the Figure, can be used, as an alternative of the real card information, for a transaction payment: the token PAN then substitutes the real PAN therefore securing the payment card. To perform tokenization, the cardholder may register its personal device 13 to its bank (reference 32 discussed below), thereby allowing this bank to directly exchange messages with the cardholder. Of course, in a variant, the cardholder may merely connect to the bank using the bank application 132 (e.g. using login and password access).

The access device 12 is configured to access the merchant system 20 and may be a web browser, a telephone, a fax, a mail, etc. Preferably, it includes a computer with a web browser allowing access to a merchant website. The computer may be the cardholder personal device 13 (for instance a smartphone implementing a web browser) or be a separate computer.

The cardholder personal device 13 is preferably a portable device, such as a mobile or smart phone, a tablet, a laptop, a personal organizer, etc. It includes I/O interfaces 130 (e.g. keyboard and screen), applications such as a web browser 131 if the device operates as the access device 12 and a bank application, e.g. a wallet software application or "electronic wallet" or "e-wallet" 132, to implement mechanisms of the present invention. The e-wallet 132 stores the card-based payment token 133.

The merchant system 20 is basically one or more conventional merchant servers 21 that hosts a merchant website with payment and transaction functionalities to purchase products. Any communication network, e.g. mobile network or Internet, can be used to connect the access device 12 to the server or servers of the merchant system 20.

The merchant servers 21, and more precisely the one or those handling the transaction functionalities, are connected to the payment system 30 through any type of communication network, typically the Internet. The merchant servers can be implemented by the merchant itself and/or by third parties providing the merchant with sell and payment functionalities.

A transaction is conventionally initiated in the merchant system 20 when a customer purchases products on the merchant website.

To initiate the transaction, the customer inputs the information of its payment card on a payment form, thereby triggering a transaction authorization process between the merchant servers 21 and the payment system 30. According to embodiments of the invention, the customer (normally the cardholder) provides, enters or types, in addition to the card information, a CVV. Advantageously, the CVV is freely selected by the customer/cardholder, any value between 0 and 999 for a 3-digit CVV or between 0 and 9999 for a 4-digit CVV. The free selection may be implemented even if the payment card 11 has a CVV printed on it. This allows the cardholder to have a better control on the CVV-based securing of the transaction. This also allows the cardholder to keep using its payment card even if the CVV has been hacked (in this case, the printed CVV may have been deactivated at the cardholder bank so that the present invention is implemented each time the card is used).

Only when an authorization response approving the transaction is received from the payment system 30, the merchant servers 21 can inform the customer that its purchase is validated, meaning the transaction is approved.

The payment system 30 handles the transaction authorization process, thus performs necessary message exchanges between the merchant bank (or "acquiring bank" or transaction receiving server) 31 and the cardholder bank (or "issuer bank") 32. The payment system 30 usually relies on a greater number of equipment items (e.g. payment gateways, servers, . . . ). For ease of illustration, only the merchant bank and the cardholder bank are shown as separate servers.

The bank servers are able to exchange messages in order to conduct the authorization process of an underlying transaction, the merchant bank 31 ultimately providing the merchant system 20 with the approval or refusal of the underlying transaction. In this process, the cardholder bank 32 usually checks the transaction information and checks whether the cardholder (identified based on the PAN) is authorized to perform the transaction (with respect to the transaction amount and the bank account balance for instance).

According to embodiments of the invention, the cardholder bank 32 in a transaction process sends a transaction authorization request to the cardholder device 13 to ask the cardholder for confirmation of the transaction and for providing or confirming the CVV entered when initiating the transaction. The confirmation of the transaction may merely results from the correct typing of the initial CVV by the cardholder on the cardholder device or by entering a CVV that should match a reference CVV based on the initial CVV.

This ensures the customer has access to the cardholder device, i.e. is in possession of credentials representing the payment card used.

The cardholder bank 32 may have control over the bank application 132 in such a way transaction details can be displayed to the cardholder with a view of performing the transaction confirmation.

FIGS. 2 to 4 illustrate methods of processing a card-not-present transaction according to embodiments of the invention.

FIG. 2 illustrate message exchanges between the entities shown in FIG. 1 to perform a transaction. FIGS. 3 and 4 illustrate general steps of the transaction performing method at respectively the consumer/cardholder environment 10 and the payment infrastructure 30, according to embodiments of the invention. The general steps of the method at the merchant system are conventional ones. Therefore, they are not shown for ease of illustration.

Initially (step 200), the payment card 11 of the cardholder is tokenized into the bank application (e-wallet) 132 of the cardholder personal device 13. This step is optional since the cardholder, as a consumer, has the choice of using either the card information printed or embossed on the card 11 or the tokenized information provided by the bank application 132 when performing a transaction with a merchant.

The tokenization provides a payment token made of a token PAN together with the expiry date in the e-wallet 132. Optionally, a set of credentials may be generated as additional data to the payment token. The credentials may include one or more (payment) keys, preferably dedicated to specific usages respectively. The credentials may be one-time credentials, time-constrained credentials in which case the personal device 13 may request new credentials when needed. The credentials may also be unlimited (in terms of use and time) and be diversified locally on the fly to provide specific credentials for specific usages.

At step 205, made of steps 206 to 209, the cardholder initiates a transaction with the merchant:

At step 206, the cardholder may for instance access a website of the merchant using the web browser 12, add some products in a shopping cart and access to a payment form displaying a total amount to pay.

At step 207, the cardholder retrieves its payment card information to enter them in the payment form. Without tokenization of the payment card 11, the cardholder reads the PAN embossed on its card 11, as well as the card expiry date. In case of card tokenization, the cardholder accesses the e-wallet 132 on its device 13 and solicits therein a new online payment. The e-wallet provides a digital display function which, when solicited for a new online payment, displays a digital token PAN and the expiry date to use for the online payment.

At step 208, the cardholder inputs the payment card information in the payment form of the merchant website. The payment card information are thus entered in the merchant system 20.

At step 209, the cardholder selects a card verification value, CVV, regardless of any CVV printed on the card, and inputs it in the payment form. The CVV is named "transaction CVV" below. It may be a 3-digit value, or a 4-digit value. Alternatively, it may comprise another number of digits.

The number of digits for the transaction CVV is known by the cardholder for instance as the number of digits of a CVV already printed on the card 11.

The cardholder may freely (thus pseudo-randomly) select the transaction CVV from the range of possible values: [0-999] for a 3-digit CVV, [0-9999] for a 4-digit value. In some embodiments, the transaction CVV must be different from a CVV already printed on the card (if any). This helps the payment system 30 (in particular the cardholder bank 32) to know whether the present method is running (to send transaction authorization requests to the cardholder devices) or a conventional process is to be applied (predefined CVV checked at the bank side).

Alternatively, the e-wallet 132 may randomly generate a (one-time) transaction CVV with the appropriate number of digits. The cardholder must then enter the generated transaction CVV.

In some embodiments, the transaction CVV is selected from a subpart of a range of possible values. For instance for a 3-digit value, the transaction CVV is selected in the range [500-999] making it possible for the payment system 30 to know when the present method is running (CVV equal or greater than 500) or a conventional process is to be applied (CVV<500).

In other embodiments, the transaction CVV may have a predefined number of digits to identify when it is a freely-chosen transaction CVV. For instance, if a 3-digit (alternatively 4-digit or any number N of digits) CVV is printed on the card, the cardholder freely chooses a 4-digit (altern. 3-digit or any number different from N) CVV. This helps the payment system 30 to know whether the present method is running (if CVV is 4-digit) or a conventional process is to be applied (if CVV is 3-digit).

In yet other embodiments, the value of the PAN provided may indicate to the payment system 30 that a freely selected CVV is used. For instance, if the printed/embossed PAN is used, the printed CVV must be provided, while when a digital token PAN is used, the customer has to freely select its CVV.

The consumer/cardholder validates the payment form by clicking on an appropriate "pay" button. This validation sends all the payment information (PAN or token PAN, expiry date, transaction CVV) to the merchant server 21 (step 210).

The merchant server 21 initiates the transaction in a conventional manner (step 215): a request for transaction is sent to the merchant bank 31. The request includes transaction information such as the transaction amount, the transaction date and hour, the token PAN (or real PAN), the expiry date and the transaction CVV entered by the consumer, as well as a merchant identifier enabling to determine the merchant bank account. Other information may be added which are not of importance for the present invention.

The merchant bank 31 next forwards the request as a transaction authorization request to the cardholder bank 32. The transaction authorization request may be the same message as, or a message different (i.e. with different data fields) from, the request for transaction. The cardholder bank 32 can be identified by the merchant bank 31 thanks to the token PAN (or real PAN) indicated in the request for transaction. The transaction authorization request includes transaction information such as the token (or real) PAN, the expiry date, the transaction CVV and the transaction amount and date/hour. This is step 220 which is conventional and thus is not described with more details.

Upon receiving the request, the cardholder bank 32 identifies the cardholder bank account thanks to the token (or real) PAN and performs conventional checks (e.g. expiry date, bank account balance with respect to the transaction amount, and so on.). This is step 225.

At step 226, the cardholder bank 32 determines whether a user confirmation of the CVV is required, i.e. whether the consumer uses a CVV printed on the payment card 11 or not.

CVV confirmation may be required if the payment card 11 is provided to the cardholder without a printed CVV or if the printed CVV has been deactivated or declared as hacked. This may also be the case if the transaction CVV provided in the transaction authorization request belongs to a dedicated range of value (e.g. [500-999] in the above example) or if the CVV has a predefined number of digits (e.g. a different number of digits compared to the CVV printed on the card 11) or is different from a CVV printed on the payment card used. CVV confirmation may also be required depending on the provided PAN, e.g. if it is a token PAN.

If no user CVV confirmation is required, conventional processing (not shown) is performed, for instance acceptance or refusal of the transaction is sent back to the merchant bank 31 or a transaction confirmation is merely solicited to the cardholder in a conventional manner.

If a user confirmation is required for the transaction CVV, the cardholder bank 32 calls on the bank application 132 in the cardholder device 13 with a transaction authorization request. This is step 227 with the transaction authorization request sent to the cardholder personal device 13.

According to embodiments, the transaction authorization request does not comprise the transaction CVV. In variants, it includes the transaction CVV with a view of displaying it to the user (cardholder/consumer) for validation or selection.

The transaction authorization request identifies the transaction (e.g. identification of the merchant, total payment amount, transaction date and hour). It is interpreted by the bank application 132 (e-wallet) as a display command to display the transaction information on a screen of the cardholder device 13 in view of obtaining user transaction confirmation from the cardholder.

In some embodiments, the display command provides an input field for the cardholder to input or type or enter the transaction CVV used at step 209 for the transaction. This is for instance the case when the transaction authorization request does not comprises the transaction CVV.

In a variant to entering the transaction CVV, the consumer may be invited to enter a reference value or CVV that is based on the transaction CVV, for instance the addition of the transaction CVV with a secret value known by the cardholder bank 32 and the cardholder. As an example a transaction 4-digit CVV may be added to the birth year of the cardholder to obtain the reference CVV to be input by the cardholder.

The CVV expected from the cardholder, no matter the transaction or reference CVV, is referred to as the expected CVV.

In other embodiments, the display command provides selectable CVVs including the expected CVV and randomly generated CVVs, for the cardholder to select the correct expected CVV. In a variant, the display command provides a display of the expected CVV for user confirmation only. This is for instance the case when the transaction authorization request includes the transaction CVV or the reference CVV if computed by the cardholder bank 32.

At step 230, the cardholder verifies the transaction information so displayed. He can confirm the transaction by inputting a CVV in the input field (named as "confirmation CVV") or selecting one CVV from the selectable CVVs or merely visually confirming the displayed CVV, and pushing a "validation" button. The cardholder may also decline the transaction (e.g. if he is not the purchaser) by pushing a "refusal" button.

This action of the cardholder/consumer is a user transaction confirmation.

The pushing of either button triggers the sending (step 235) of a transaction authorization response to the cardholder bank 32. The response includes the confirmation CVV, if any, input or selected or confirmed at step 230.

In some embodiments, the transaction authorization response is digitally signed at optional step 234. The digital signature is performed based on a credential of the payment token 133. A one-time or time-constrained credential for digital signature is used, or a specific credential is diversified from a root credential for digital signature and then used.

This digital signature guarantees the transaction details (information) validated by the cardholder. This provides a layer of security against for instance a man in the middle wishing to modify the transaction amount between the various requests and response exchanged.

The signature is sent together with the transaction authorization response. In case a locally-diversified specific credential is used, an index or any other information (e.g. diversifier) may be included in the response for the cardholder bank to be able to locally regenerate the same specific credential (for signature check purpose).

At step 240, the cardholder bank 32 takes a transaction authorization decision based on the response so received, optionally with the digital signature.

This may include optional step 241 of verifying the digital signature attached to the received response.

To do so, the cardholder bank 32 may locally generate the same token with credentials as previously (step 200) done in the cardholder personal device 13 or merely retrieves the credential for digital signature from local memory if already generated or diversifies a credential using the index or diversifier specified in the received response, to obtain the diversified specific credential. This is possible since the bank 32 has knowledge of all the payment card information.

The same credentials are then used to locally generate another digital signature based on the expected (i.e. transaction or reference) CVV and the transaction information. For instance, a message similar to the received transaction authorization response is built but that comprises the transaction information and the expected CVV. The signature is then computed from this message. The locally-generated signature and the received signature are then compared one to each other. The transaction authorization response can be processed only when the two signatures are the same, meaning the response is trusted. It results that an approval of the transaction itself can be decided only if the two signatures are the same (signature verification is positive).

Next step 242 consists for the cardholder bank 32 to verify the confirmation CVV (received at step 235) with the expected CVV that is based on the transaction CVV (received at step 220). The underlying transaction can be approved if the confirmation CVV and the expected CVV are the same.

In the decision, the cardholder bank 32 can also takes into account (step 243) the results of the conventional checks of step 225 (payment card still valid with respect to the expiry date and/or sufficient bank account balance with respect to the transaction amount, and so on.).

In some embodiments, the cardholder bank 32 may also check (step 244) that the CVV used (in case CVV check at step 242 is positive) is not the same as the ones used during the last N (integer) transactions for the same payment card 11. To that end, the cardholder bank 32 may record in a history memory all the CVVs involved in the transactions for the cardholder. Preferably, only the CVVs for an approved transaction are recorded. The transaction may be refused if the transaction CVV is the same as one CVV used during one previous transaction.

As the digital signature is optional, step 241 is optional. When a digital signature is implemented, step 242 may be optional. Indeed, a positive signature verification (step 241) is enough because it means that the confirmation CVV (through the received signature) equals the expected CVV (through the locally-generated signature).

Once the cardholder bank 32 has taken the transaction authorization decision, it sends a transaction authorization response to the merchant bank 31 (step 245) indicating the approval or the refusal of the underlying transaction. A unique identifier of the transaction may be tracked in all the messages exchanged in the system 1 to facilitate the management of the underlying transaction from among a multiple of simultaneous transactions.

The transaction decision (as specified in the response) is processed in a conventional manner by the merchant bank 31: the decision is forwarded to the merchant system (step 250) and in case of transaction approval, money transfer between the two banks is initiated and realized.

The merchant server 21 then processes the decision still in a conventional manner, with a display to the customer of the transaction result in the web browser 12: purchase confirmed or transaction refused (step 255).

Some steps of the process can be made simultaneously or their order can be changed. For instance, the order of steps 241 to 244 does not really matter.

As shown in FIG. 3, the cardholder as a consumer wishing to perform a transaction first displays, at optional step 300, card-based payment token information on a screen of its cardholder device 13, such as a token PAN and a card expiry date.

Next, the cardholder enters, at step 305, payment information and a transaction CVV in the merchant system 20 connected to the payment system 30, to initiate the transaction via the merchant system. This may be done in a payment form in a web browser accessing a merchant web site.

As shown in FIG. 4, the payment system 30 (the merchant bank 31) thus receives at step 400 a request for a transaction from the merchant system 20, the request for the transaction including the transaction CVV and transaction information.

At step 405, the payment system 30 (the cardholder bank 32) sends a transaction authorization request to the cardholder personal device 13. The sending is responsive to the receiving of the request for transaction from the merchant system 20. Some message exchanges between the merchant bank and the cardholder bank drive the responsive process.

At step 310, the transaction authorization request is received by the cardholder device 13 triggering a display of the transaction information on the cardholder device 13 and inviting the cardholder to enter the expected CVV (transaction or reference CVV if applicable) for confirmation purpose or to select a CVV from amongst displayed selectable CVVs (including the expected CVV) or to visually confirm the displayed expected CVV.

At step 315, the cardholder enters a CVV or select a selectable CVV or confirm a displayed CVV, all referred to as a confirmation CVV, on the cardholder device 13 and confirms (or declines) the displayed transaction.

This generates and sends a transaction authorization response to the payment system, at step 320.

At step 410, the payment system 30 (the cardholder bank 32) receives the response to the transaction authorization request from the cardholder device 13. The response is based on the confirmation CVV and may optionally be accompanied with a digital signature as mentioned above.

At step 415, the payment system 30 approves (accepts, authorizes, confirms, validates) or refuses (declines, rejects) the transaction based on the transaction and confirmation CVVs. In particular, the transaction is approved when the two CVVs are one and the same or when the confirmation CVV equals the reference CVV. Other criteria as described above can be used to approve or refuse the transaction, for instance the CVV compared to the CVVs used in previous transactions or the cardholder account balance.

At step 420, the transaction authorization decision is sent to the merchant system 20.

At step 325, the cardholder, via the web browser or the like, receives through the merchant system the approval or refusal of the transaction.

The present invention, embodiments of which are described above, allows the security of on-line transactions to be improved. Indeed, the cardholder keeps control on the validation of any transaction involving its payment card. Furthermore, the CVVs are protected from fraudulent use since they have a short life, are generated for each new transaction and require confirmation by the cardholder himself.

Additionally, the present invention does not modify the existing merchant systems and reuses the existing payment infrastructure by only adding a CVV confirmation module at the cardholder banks. Advantageously, by letting the cardholder choosing the CVVs without dynamic generation, PCI certification constraints on the servers managing the payment card are reduced.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular, the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of performing a card-not-present transaction, the method comprising, at a payment system:
    receiving, from a merchant system,
        transaction information including payment card information entered by a user in the merchant system, and
        a user-defined first card verification value (CVV) entered by the user in the merchant system, the user-defined first card verification value (CVV) satisfying one or more conditions;
    upon receiving the transaction information,
        checking that the one or more conditions is fulfilled, and
        automatically sending a transaction authorization request to a cardholder device;
    generating a first digital signature based on a card-payment token at the cardholder device;
    subsequently receiving, from the cardholder device, a transaction authorization response including the first digital signature and a second CVV provided by the user on the cardholder device;
    validating, by a cardholder bank, the received payment card information and the first digital signature;
    comparing, by the cardholder bank, the second CVV to an expected value of the user-defined first CVV; and
    determining, by the cardholder bank, a transaction authorization decision that approves the transaction based on determining that the second CVV equals the expected value of the user-defined first CVV, and successful validation of the payment card information and the first digital signature, the determining the transaction authorization decision comprising
        computing a second digital signature based on the user-defined first CVV and a locally-generated card-based payment token for the cardholder, and
        comparing the first and second digital signatures.

2. The method of claim 1, wherein the user-defined first CVV is entered by the cardholder in the merchant system and the second CVV is entered by the cardholder on the cardholder device or selected by the cardholder from a list of CVVs displayed on the cardholder device or confirmed by the cardholder when displayed on the cardholder device.

3. The method of claim 1, wherein the receiving the transaction authorization response is responsive to sending the transaction authorization request to the cardholder device.

4. The method of claim 3, wherein the sending the transaction authorization request is responsive to receiving a request for a transaction from the merchant system, the request for the transaction including the user-defined first CVV and the transaction information.

5. The method of claim 1, wherein the transaction is refused when the user-defined first CVV is the same as one CVV used during a last transaction.

6. The method of claim 1, wherein the one or more conditions includes the user-defined first card verification value (CVV) is different from a CVV already printed on the payment card.

7. The method of claim 1, wherein the one or more conditions includes the user-defined first card verification value (CVV) is selected from a subpart of a range of possible values.

8. The method of claim 1, wherein the one or more conditions includes the user-defined first card verification value (CVV) has a predefined number of digits different from the number of digits of a CVV already printed on the payment card.

9. A method of performing a card-not-present transaction, the method comprising:
    entering, by a user, a user-defined first card verification value (CVV) and payment card information in a merchant system connected to a payment system, to initiate a transaction, the user-defined first card verification value (CVV) satisfying one or more conditions;
    in response to determining that the one or more conditions is fulfilled, generating a first digital signature based on a card-payment token at the cardholder device;
    subsequently entering a user transaction confirmation on a cardholder device connected to the payment system, the user transaction confirmation including a second CVV, and generating a transaction authorization response including the first digital signature and the second CVV provided by the user on the cardholder device;
    validating, by a cardholder bank, the received payment card information and the first digital signature;
    comparing, by the cardholder bank, the second CVV to an expected value of the user-defined first CVV; and
    receiving, through the merchant system, a transaction authorization decision that approves the transaction based on determining that the second CVV equals the expected value of the user-defined first CVV, and successful validation of the payment card information and the first digital signature, the transaction authorization decision being determined by:
        computing a second digital signature based on the user-defined first CVV and a locally-generated card-based payment token for the cardholder, and
        comparing the first and second digital signatures.

10. The method of claim 9, wherein the entering the user transaction confirmation is responsive to the transaction authorization request from the payment system that displays information of the transaction on the cardholder device.

11. The method of claim 9, further comprising previously displaying card-based payment token information on a screen of the cardholder device, the user-defined first CVV being entered in the merchant system together with the displayed card-based payment token information.

12. The method of claim 9, wherein the entering the user transaction confirmation includes selecting the second CVV from a list of CVVs displayed on the cardholder device or confirming a CVV displayed on the cardholder device as the second CVV.

13. The method of claim 9, wherein the entering the user transaction confirmation includes confirming a CVV displayed on the cardholder device as the second CVV.

14. The method of claim 9, wherein the one or more conditions include at least one of:
the user-defined first card verification value (CVV) is different from a CVV already printed on the payment card,
the user-defined first card verification value (CVV) is selected from a subpart of a range of possible values, and
the user-defined first card verification value (CVV) has a predefined number of digits different from the number of digits of a CVV already printed on the payment card.

15. A payment system processing a card-not-present transaction, the payment system comprising:
a transaction receiving server configured to receive, from a merchant system,
transaction information including payment card information entered by a user in the merchant system, and
a user-defined first card verification value (CVV) entered by the user in the merchant system, the user-defined first card verification value (CVV) satisfying one or more conditions;
a cardholder device configured to generate and transmit a transaction authorization response including a second CVV provided by the user on the cardholder device; and
an authorization server configured to
subsequently receive, from the cardholder device, the transaction authorization response including the second CVV provided by the user on the cardholder device, and a first digital signature being generated based on a card-payment token at the cardholder device,
validate the received payment card information and the first digital signature,
compare the second CVV to an expected value of the user-defined first CVV, and
determine a transaction authorization decision that approves the transaction based on determining that the second CVV equals the expected value of the user-defined first CVV, and successful validation of the payment card information and the first digital signature, the transaction authorization decision being determined by:
computing a second digital signature based on the user-defined first CVV and a locally-generated card-based payment token for the cardholder, and
comparing the first and second digital signatures.

16. The payment system of claim 15, wherein the one or more conditions include at least one of:
the user-defined first card verification value (CVV) is different from a CVV already printed on the payment card,
the user-defined first card verification value (CVV) is selected from a subpart of a range of possible values, and
the user-defined first card verification value (CVV) has a predefined number of digits different from the number of digits of a CVV already printed on the payment card.

17. A method of performing a card-not-present transaction, the method comprising, at a payment system:
tokenizing payment card information to obtain a card-payment token;
receiving, from a merchant system,
transaction information including said token, and
a user-defined first card verification value (CVV) entered by the user in the merchant system, the user-defined first card verification value (CVV) satisfying one or more conditions;
upon receiving the transaction information,
checking that the one or more conditions is fulfilled, and
automatically sending a transaction authorization request to a cardholder device;
generating a first digital signature based on the card-payment token at the cardholder device;
subsequently receiving, from the cardholder device, a transaction authorization response including the first digital signature and a second CVV provided by the user on the cardholder device;
validating, by a cardholder bank, the tokenized payment card information and the first digital signature;
comparing, by the cardholder bank, the second CVV to an expected value of the user-defined first CVV; and
determining, by the cardholder bank, a transaction authorization decision that approves the transaction based on determining that the second CVV equals to the expected value of the user-defined first CVV, and successfully validating validation of the tokenized payment card information and the first digital signature, the validating the tokenized payment card information and the first digital signature including
computing a second digital signature based on the user-defined first CVV and a locally-generated card-based payment token for the cardholder, and
comparing the first and second digital signatures.

18. The method of claim 17, wherein the one or more conditions include at least one of:
the user-defined first card verification value (CVV) is different from a CVV already printed on the payment card,
the user-defined first card verification value (CVV) is selected from a subpart of a range of possible values, and
the user-defined first card verification value (CVV) has a predefined number of digits different from the number of digits of a CVV already printed on the payment card.

* * * * *